Sept. 2, 1924.

W. A. CHRYST 1,507,306

IGNITION SYSTEM

Filed March 22, 1920     4 Sheets-Sheet 1

Sept. 2, 1924.
W. A. CHRYST
IGNITION SYSTEM
Filed March 22, 1920
1,507,306
4 Sheets-Sheet 2
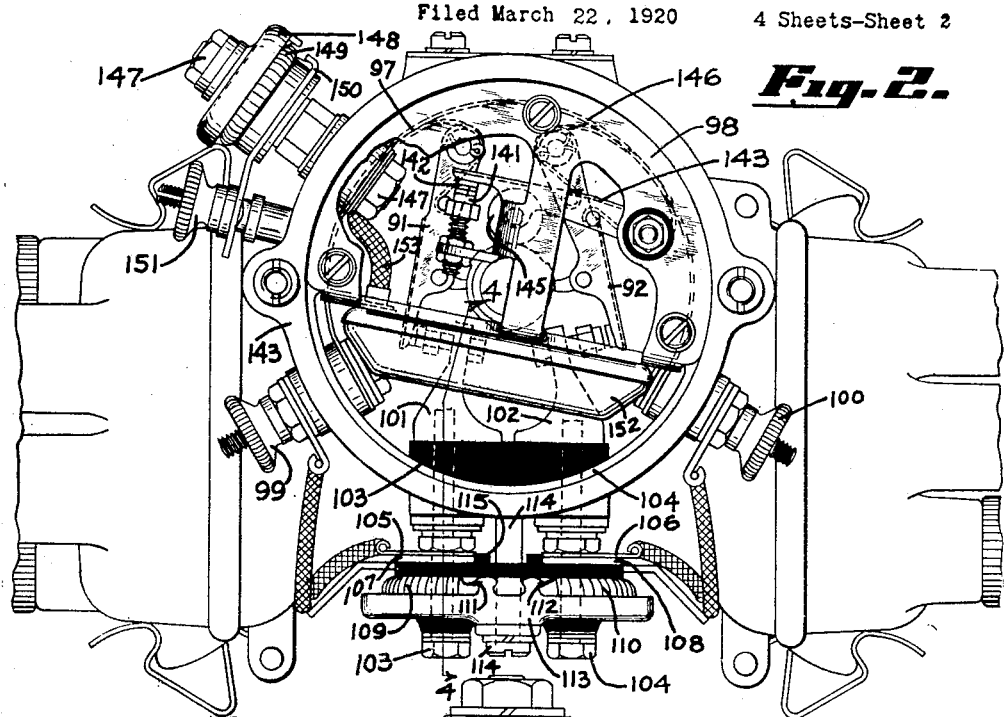
Fig. 2.
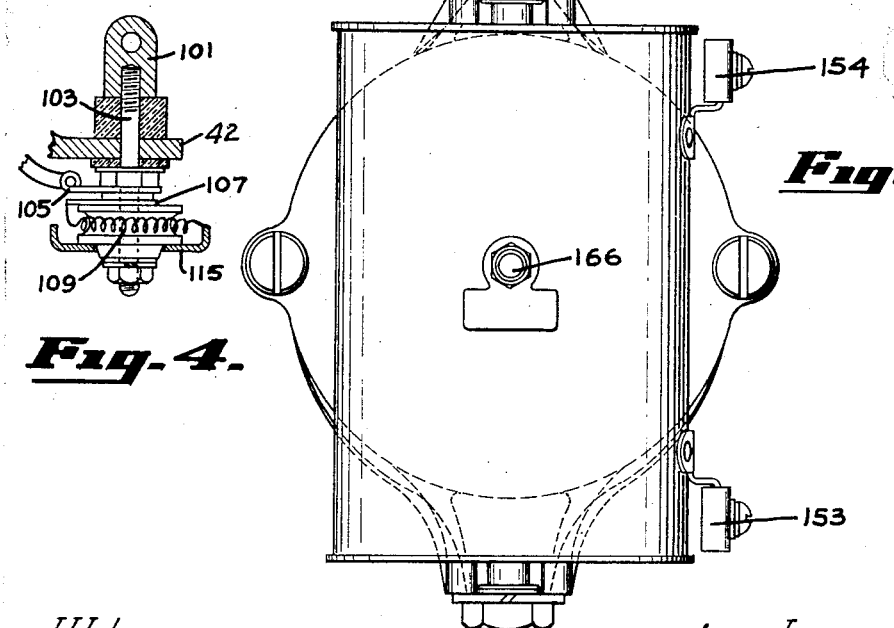
Fig. 4.
Fig. 3.
Witnesses
Inventor
William A. Chryst
By Kerr, Page, Cooper and Hayward
Attorneys Sept. 2, 1924.  
W. A. CHRYST  
IGNITION SYSTEM  
Filed March 22, 1920  
1,507,306  
4 Sheets-Sheet 3

Patented Sept. 2, 1924.

1,507,306

UNITED STATES PATENT OFFICE.

WILLIAM A. CHRYST, OF DAYTON, OHIO, ASSIGNOR TO THE DAYTON ENGINEERING LABORATORIES COMPANY, A CORPORATION OF OHIO.

IGNITION SYSTEM.

Application filed March 22, 1920. Serial No. 367,630.

*To all whom it may concern:*

Be it known that I, WILLIAM A. CHRYST, a citizen of the United States of America, residing at Dayton, county of Montgomery, State of Ohio, have invented certain new and useful Improvements in Ignition Systems, of which the following is a full, clear, and exact description.

This invention relates to ignition systems for internal-combustion engines provided with electrical ignition apparatus for firing the fuel charge in the engine cylinders, and provided also with an electrically ignited fuel burner for heating the engine intake.

It is an object of the present invention to provide for the operation of the engine ignition apparatus and the burner ignition apparatus from a common source of current, and to provide common means for connecting all of these apparatuses with the current source.

In carrying out the foregoing aim of the invention it is a further object of the invention to provide a common engine driven element or cam cooperating circuit interruptor of the engine ignition apparatus and the circuit interruptor of the burner apparatus.

A further object of the invention is to provide for assembling together in a unitary structure certain elements of the burner ignition apparatus, said unitary structure being adapted to be attached to and supported by certain forms of ignition apparatus already in use. This unitary structure provides for the location of a portion of the burner timer in proximity to the ignition timer cam so that the ignition timer cam may function to operate the burner ignition apparatus.

Further objects of the present invention will be apparent from the following description, reference being had to the accompanying drawings wherein preferred embodiments of the present invention are clearly shown.

In the drawings:

Fig. 1 shows also a front elevation of an ignition unit embodying the present invention.

Fig. 2 is a fragmentary plan view on an enlarged scale of the ignition unit shown in Fig. 1, certain parts having been removed.

Fig. 3 is a plan view of the ignition unit cover shown supporting the burner ignition coil.

Fig. 4 is a detailed sectional view taken on the line 4—4 of Fig. 2.

Figure 1:
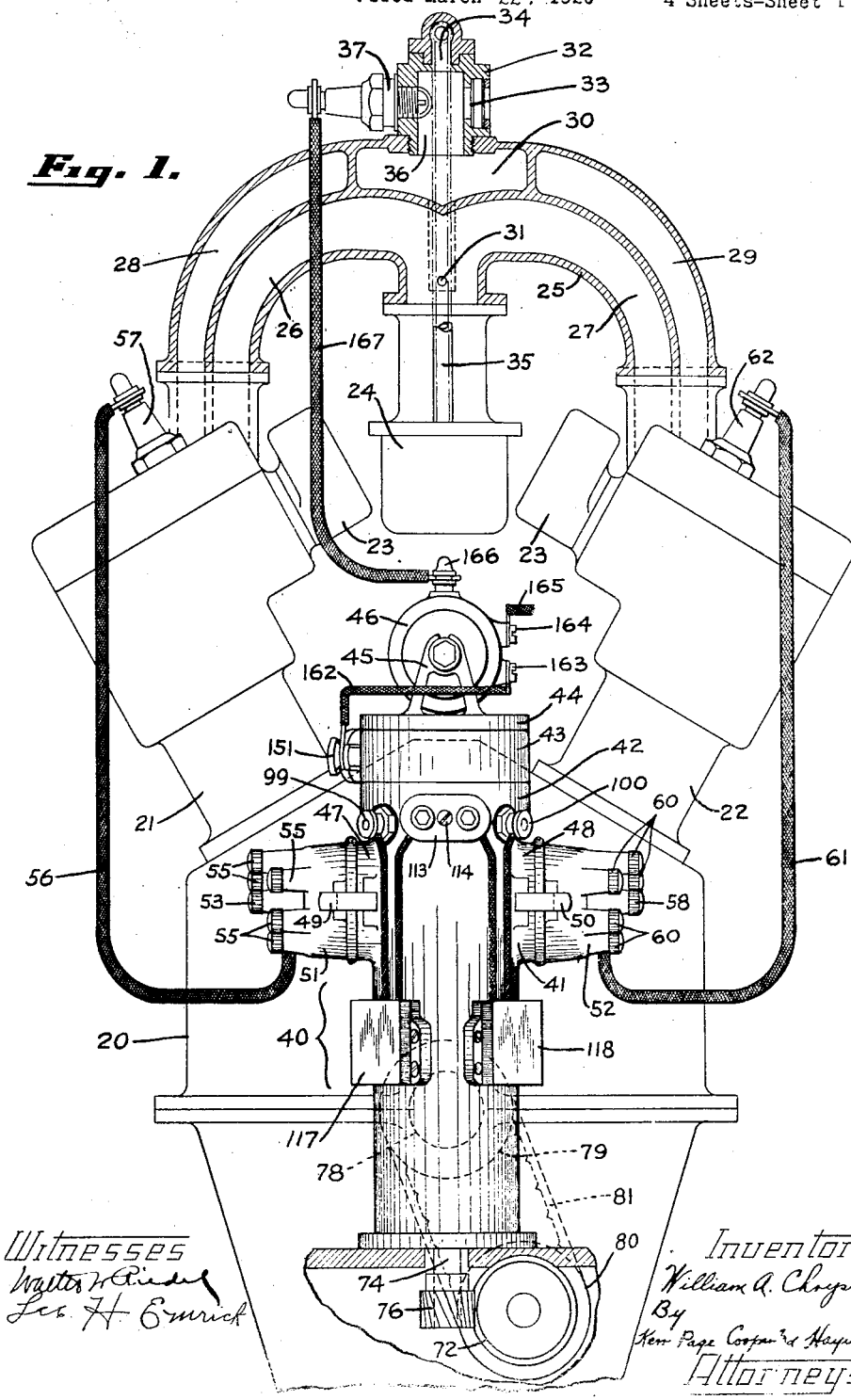
Fig. 1 is an end elevation partly in section of a V-type multi-cylinder internal-combustion engine the engine intake and engine heating burner being shown partly in section.

Referring to the drawings: The internal-combustion engine 20 shown in Fig. 1 includes two rows of cylinders arranged in converging relation, the end cylinder of each row being designated by numerals 21 and 22. Each row of cylinders is connected with an exhaust manifold 23. The engine carburetor 24 is connected with and supported by an intake header 25, which is provided with engine fuel passages 26 and 27, circulating water passages 28 and 29 and with burner flame passage 30 which is connected with the fuel passages 26 and 27 through the orifice 31. The burner 32 which is supported by the header 25, is provided with an air intake passage 33 and with a fuel inlet passage 34 which is connected by means of pipe 35 with carburetor 24. The air and liquid fuel are sucked by the operation of the engine into the mixing chamber 36 of the burner 32, where the burner fuel is ignited by means of sparks from the spark plug 37 which is connected with the burner ignition apparatus to be described.

40 designates as a whole an ignition unit including apparatus for engine ignition and for burner ignition. The unit 40 is supported in any suitable manner upon the engine as indicated diagrammatically in Fig. 1. The unit 40 comprises a housing 41 for enclosing the driving mechanism and the engine ignition apparatus. The housing 41 terminates at its upper end in a timer cup 42 upon which is supported an annular housing 43 which surrounds certain elements of the burner ignition apparatus. The housing 43 supports a cover 44 with which is formed preferably integrally a coil bracket 45 supporting the burner ignition coil 46.

At right angles to the axes of the housing 41 are arranged axially aligned annular flanges 47 and 48 to which are attached by means of clips 49 and 50, distributor heads 50 and 52. Distributor head 51 is provided with a central terminal 53 which cooperates with a distributor rotor 54 to distribute sparking impulses to one end of an annular row of terminals 55, each of terminals 55 being connected with a spark plug to each of the cylinders of the left hand row, as viewed in Fig. 1. One of these terminals 55 is shown connected by wire 56 with the spark plug 57 of cylinder 21. The distributor head 52 is similarly provided with a center contact 58 which cooperates with a rotor 59 (see Fig. 6) to distribute sparking impulses to any one of an annular row of terminals 60, each of these terminals 60 being connected to an engine spark plug of the right hand row of cylinders, as viewed in Fig. 1. One of the terminals 60 is shown connected by means of wire 61 by the spark plug 62 of cylinder 22.

Figure 5:
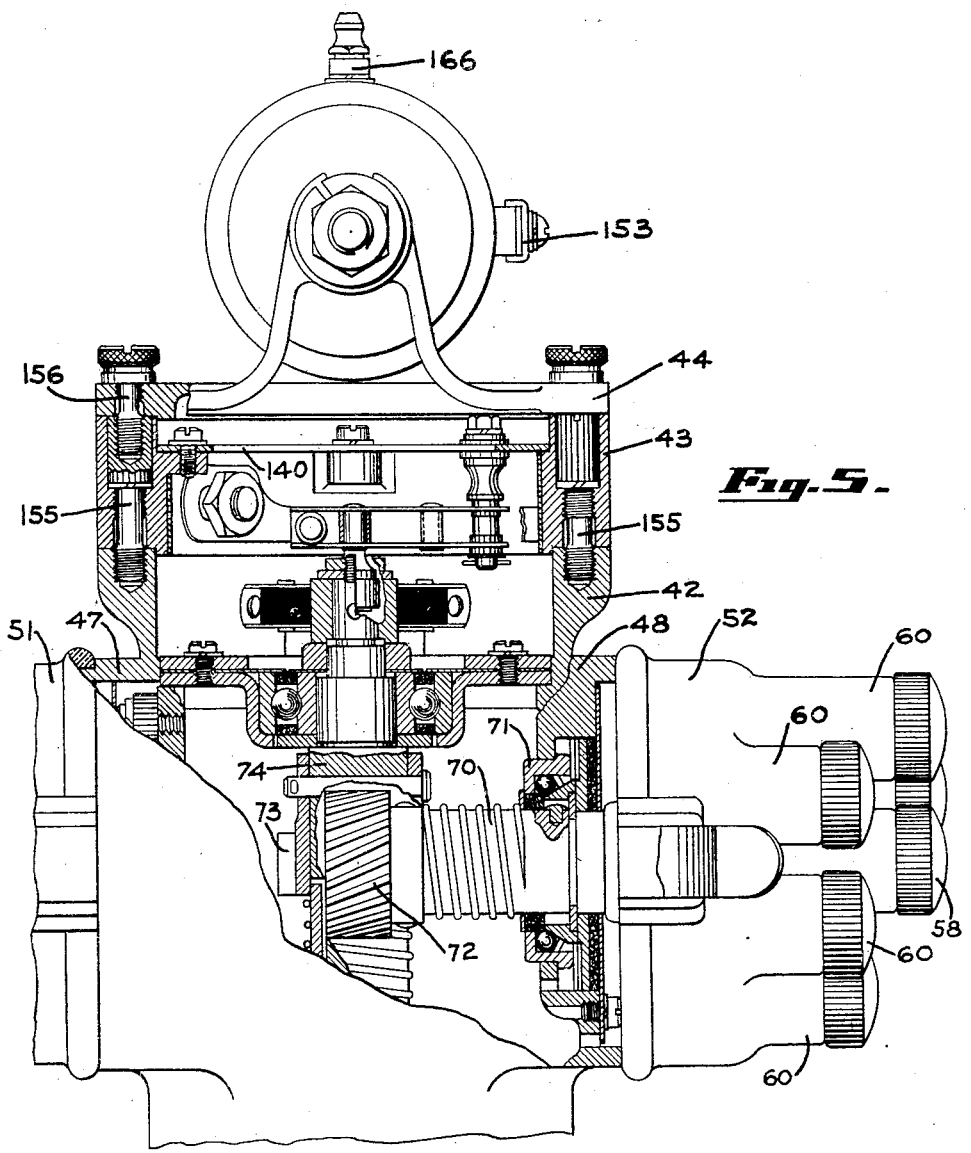
Fig. 5 is a fragmental side elevation partly in section of the ignition unit shown in Fig. 1.
Figure 6:
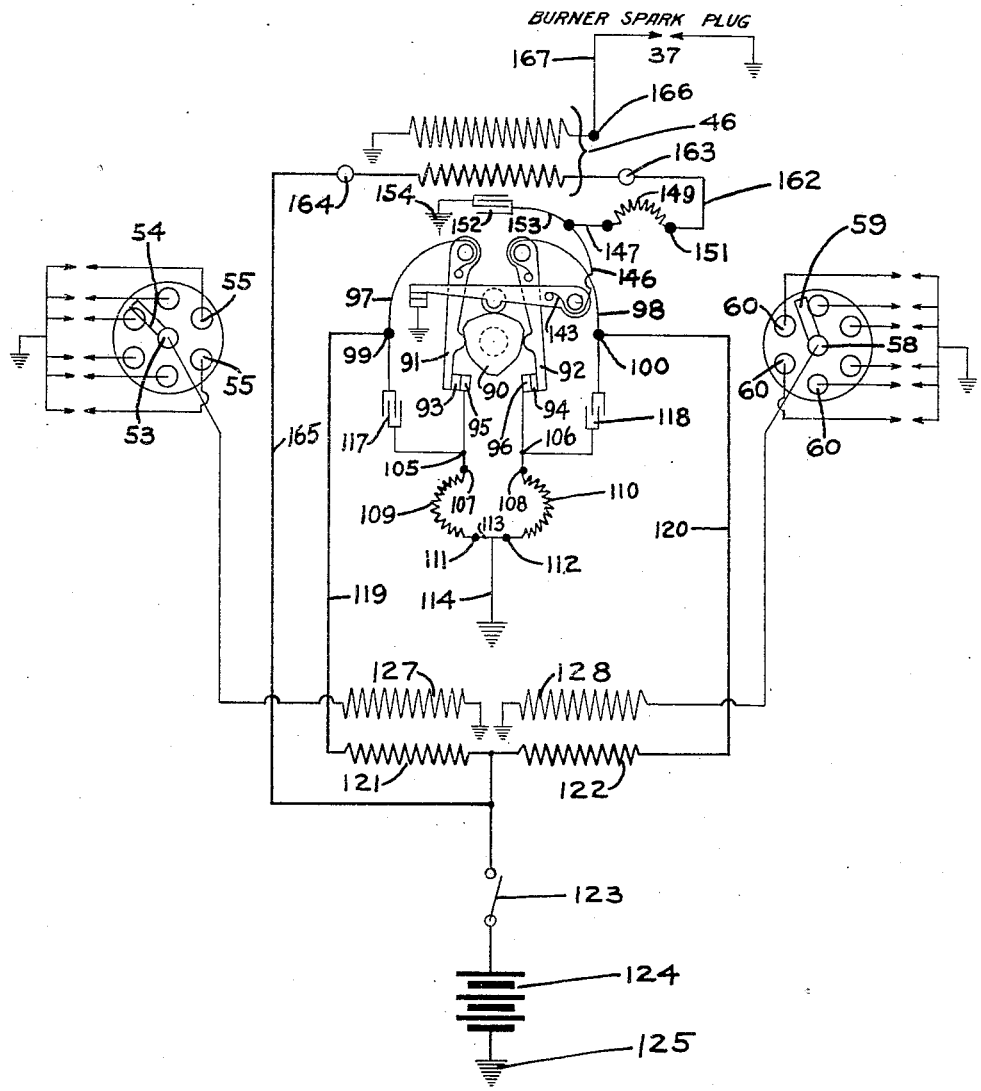
Fig. 6 is a wiring diagram of the ignition system embodying the present invention.

These rotors 54 and 59 which are shown diagrammatically in Fig. 6 are mounted upon the shaft 70, a part of which is shown in Fig. 5. Shaft 70 is suitably journalled in bearings supported by the housing 41, one of these bearings being shown at 71. Shaft 70 is provided with a spiral gear 73 which is supported by timer shaft 74 suitably journalled within bearings supported by the housing 41, one of these bearings being shown at 75. Shaft 74 supports at its lower end gear 76 meshing with a gear 77 which is connected with the engine crank shaft 78 in any suitable manner as by means of sprockets 79 and 80 and chain 81.

The shaft 74 supports at its upper end timer cam 90. Cam 90 cooperates with engine ignition breaker levers 91 and 92 which are arranged with respect to the cam 90 in such a manner as to be alternately operated. Breaker levers 91 and 92 are supported within the timer cup 42 but are insulated therefrom in any suitable manner, and are provided with movable timer contacts 93 and 94, respectively, which cooperate with stationary timer contacts 95 and 96, respectively. The levers 91 and 92 are maintained in yielding engagement with the cam or with the stationary contacts by means of springs 97 and 98, respectively, which are connected with insulated terminals 99 and 100, respectively. The stationary contacts 95 and 96 are mounted upon conducting blocks 101 and 102, respectively, which are connected by means of bolts 103 and 104, respectively, with condenser terminals 105 and 106, respectively, and with ignition resistance terminals 107 and 108, respectively. Terminals 107 and 108 are connected with resistances 109 and 110, respectively, the other terminals of which are connected at 111 and 112, respectively, with a conducting plate 113 which is attached to the housing 41 by means of screw 114. The resistances 109 and 110 are insulated from one another and from the plate 113 by means of porcelain member 115 and condensers 117 and 118 are connected with terminals 105 and 106, respectively, and with terminals 99 and 100, respectively.

Terminals 99 and 100, respectively, are connected by the wires 119 and 120, respectively, with ignition coil primary windings 121 and 122, respectively, which are both connected through ignition switch 123 with battery 124 which is grounded at 125. Ignition primary windings 121 and 122 cooperate with ignition secondary windings 127 and 128, respectively, which are connected with distributor terminals 53 and 58, respectively.

As has been explained before the cam 90 renders the breakers 91 and 92 alternately operative to produce a current flow and the building up of energy in the coils 121 and 122, respectively; and said cam 90 effects the alternate discharge of energy to the secondary coils 127 and 128. The distributor rotors 54 and 59 are so arranged with respect to another and to the cam 90 that the distributors are alternately operative in a manner corresponding to the operation of the breakers 91 and 92. In this manner one source of current is made to supply two sets of ignition apparatus which are controlled by single engine driven member. While one coil is building up its energy the other coil is being discharged to produce a sparking impulse for ignition purposes.

The engine ignition apparatus which has been described does not of itself constitute my invention but is described and claimed in the patent to C. F. Kettering, No. 1,272,056, issued July 9, 1918.

The burner ignition apparatus will now be described more fully. The annular housing 43 supports a bracket 140 which in turn supports an adjustable stationary timer contact 141 which cooperates with a movable contact 42 carried by the burner breaker lever 143, which is pivotally mounted upon the bracket 140 but insulated therefrom in any suitable manner. Lever 143 is provided with a downwardly projecting stud 144 supporting a roller 145 which is located in the plane of the timer cam 90 so as to be operated thereby. The lever 143 is mounted in yielding engagement with the cam 90 or with the contact 141 by means of a spring 146 which serves to make an electrical connection between the lever 143 and insulated terminal bolt 147. The bolt 147 supports a plate 148 making electrical connection with the insulated resistance element 149 which in turn is connected with an insulated plate 150, which in turn is connected with the burner terminal 151 which is insulated from the housing 143.

The bracket 140 supports a condenser 152, one terminal 153 which is connected with terminal bolt 147, and the terminal of which is grounded as indicated at terminal 154 in Fig. 6. The housing 43 is adapted to be supported by and to form a continuation of the timer cup 42. Housing 43 is maintained in position by means of screws 155 which are internally threaded at their upper end to cooperate with screws 156 which serve to maintain the cover 44 in position upon the housing 43. The members 42, 43 and 44 cooperate to form an enclosure for the engine ignition and burner ignition interruptor apparatus.

The burner ignition terminal 161 is connected by means of wire 162 with burner coil primary terminal 163. The burner coil primary terminal 164 is connected by means of a wire 165 with ignition switch 123. The burner ignition coil high tension terminal 166 is connected by means of wire 167 with burner spark plug 37.

The operation of the burner ignition apparatus is as follows: During the interval between which both the breaker levers 91 and 92 of the engine ignition timer are maintained in contact closing position, the cam 90 contacts with the roller 145 to separate the burner ignition contacts 141 and 142, thereby causing the discharge of the ignition coil 46 through the spark plug 37. The rapid intermittent operation of the breaker 143 by means of the cam produces a series of sparks at spark plug 37 at sufficient frequency to maintain the liquid fuel passing into the burner 32 in a state of combustion. The products of combustion pass into the chamber to heat the intake header 25 and ultimately pass through the orifice 31 and mix with the fuel charge which is taken into the engine.

From the foregoing description it is apparent that in a very simple manner a form of ignition apparatus already in use has been provided with an attachment rendering the ignition apparatus capable of supplying ignition for other purposes than that required for engine ignition.

It is apparent that the method of controlling the ignition system is very simple, since but one switch is necessary to control both the ignition and burner apparatus, therefore the operation of the burner ignition system, while the engine ignition system is operative, is assured.

While the forms of mechanisms herein shown and described constitute preferred forms of embodiments of the invention, it is to be understood that other forms might be adopted, all coming within the scope of the claims which follow.

I claim:

1. In an ignition system for an internal-combustion engine provided with a fuel burner for heating the intake, the combination with a current source; of engine ignition apparatus including an engine controlled circuit interruptor and a housing for the same, and an engine driven cam for intermittently operating said interruptor; and burner ignition apparatus including an engine controlled circuit interruptor, and a housing for the same adapted to be supported by the engine interruptor housing, said burner interruptor having a movable portion projecting into the plane of said cam to be operated thereby.

2. In an ignition system for an internal-combustion engine provided with a fuel burner for heating the intake, the combination with a current source; of a plurality of ignition apparatuses for the engine each including an engine controlled circuit interruptor having a movable breaker lever, and an engine driven cam, said cam and levers being arranged for the alternate operation of the levers by the cam; a housing for the cam and interruptors; and burner ignition apparatus including an engine controlled circuit interruptor having a movable breaker lever and a housing for the same adapted to be supported by the engine interruptor housing, said burner breaker lever having a portion projecting into the plane of said cam so as to be operated thereby when the engine ignition interruptors are in operation.

3. In an ignition system for an internal-combustion engine provided with a fuel burner for heating the intake, the combination with a current source; of engine ignition apparatus including an engine controlled circuit interruptor and circular timer cup housing for the same, and an engine driven cam for intermittently operating said interruptor; and burner ignition apparatus including an engine controlled circuit interruptor comprising a stationary contact and a movable breaker lever carrying a movable contact and a condenser in parallel with said contacts, said movable contact carrying a follower projecting into the plane of said cam, and including also a housing for said interruptor and condenser and adapted to be supported by and to form a continuation of the said timer cup; and a cover for said burner interruptor housing.

4. In an ignition unit for an internal-combustion engine having a burner for heating the intake thereof, and provided with engine ignition apparatus and burner ignition apparatus; the combination with a unitary structure including a timer cup for housing the engine ignition timer; of an annular member surrounding and supporting the burner ignition interruptor and arranged to be supported by and to form a continuation of the timer cup; and a cover for the annular member.

5. In an ignition unit for an internal combustion engine having a burner for heating the intake thereof, and provided with engine ignition apparatus and burner ignition apparatus; the combination with a unitary structure including a timer cup for housing the engine ignition timer; of an annular member surrounding and supporting the burner ignition interruptor and arranged to be supported by and to form a continuation of the timer cup; a cover for the annular member including a bracket formed integrally therewith; and a burner ignition coil supported by said bracket.

6. In an ignition system for internal combustion engines, the combination with a timer cup and engine driven, cam operated means therein for supplying ignition to the engine cylinders; of a detachable, cam operated ignition mechanism for an auxiliary fuel burner, adapted to be mounted on the timer cup and operated by the cam therein.

7. In an ignition system, the combination with a source of current; a housing; an engine driven shaft; cam means in the housing and actuated by the shaft; electrical mechanism operated by the cam means for supplying ignition to an engine; and a fuel burner ignition mechanism including an attachment to said housing, said attachment having a current interrupting device actuated by the cam means driven by the shaft for intermittently supplying sparking impulses to a burner.

In testimony whereof I affix my signature.

WILLIAM A. CHRYST.

Witnesses:
WALTER W. RIEDEL,
J. W. McDONALD.